(12) United States Patent
Lan

(10) Patent No.: US 7,660,028 B2
(45) Date of Patent: Feb. 9, 2010

(54) APPARATUS AND METHOD OF DUAL-MODE DISPLAY

(75) Inventor: Je-Hsiung Lan, Cupertino, CA (US)

(73) Assignee: QUALCOMM MEMS Technologies, Inc., San Diego, CA (US)

(*) Notice: Subject to any disclaimer, the term of this patent is extended or adjusted under 35 U.S.C. 154(b) by 17 days.

(21) Appl. No.: 12/058,456

(22) Filed: Mar. 28, 2008

(65) Prior Publication Data
US 2009/0244683 A1 Oct. 1, 2009

(51) Int. Cl.
G02F 1/03 (2006.01)
F01V 21/00 (2006.01)
G09G 3/34 (2006.01)
G02B 27/00 (2006.01)

(52) U.S. Cl. .................. 359/260; 362/249.02; 345/85; 359/578

(58) Field of Classification Search ................. 257/431; 345/84, 85, 102; 359/260, 292, 297, 578; 362/97.1, 249.02
See application file for complete search history.

(56) References Cited

U.S. PATENT DOCUMENTS

| | | | |
|---|---|---|---|
| 4,441,791 A | 4/1984 | Hornbeck |
| 4,571,603 A | 2/1986 | Hornbeck et al. |
| 4,748,366 A | 5/1988 | Taylor |
| 4,859,060 A | 8/1989 | Katagiri et al. |
| 4,954,789 A | 9/1990 | Sampsell |
| 5,083,857 A | 1/1992 | Hornbeck |
| 5,216,537 A | 6/1993 | Hornbeck |
| 5,226,099 A | 7/1993 | Mignardi et al. |
| 5,489,952 A | 2/1996 | Gove et al. |
| 5,526,172 A | 6/1996 | Kanack |
| 5,530,240 A | 6/1996 | Larson et al. |
| 5,550,373 A | 8/1996 | Cole et al. |
| 5,551,293 A | 9/1996 | Boysel et al. |
| 5,629,521 A | 5/1997 | Lee et al. |
| 5,815,141 A | 9/1998 | Phares |
| 6,040,937 A | 3/2000 | Miles |
| 6,295,048 B1 | 9/2001 | Ward et al. |
| 6,304,297 B1 | 10/2001 | Swan |
| 6,307,194 B1 | 10/2001 | Fitzgibbons et al. |

(Continued)

FOREIGN PATENT DOCUMENTS

EP 0 725 380 8/1996

(Continued)

OTHER PUBLICATIONS

ISR and WO dated Jul. 23, 2009 for PCT/US09/037583.

(Continued)

Primary Examiner—David N Spector
(74) Attorney, Agent, or Firm—Knobbe, Martens, Olson & Bear LLP

(57) ABSTRACT

One embodiment includes display comprising a light modulator configured to display a portion of an image such as a reflective light modulator, a light emitter configured to display the portion of the image and a circuit configured to selectively provide signals to at least one of the light modulator and the light emitter indicative of the portion of the image. In one such embodiment, an active matrix provides a simple, efficient drive for such devices. Other embodiments methods of making and driving such devices.

29 Claims, 16 Drawing Sheets

U.S. PATENT DOCUMENTS

| | | | |
|---|---|---|---|
| 6,666,561 | B1 | 12/2003 | Blakley |
| 6,674,562 | B1 | 1/2004 | Miles et al. |
| 6,819,469 | B1 | 11/2004 | Koba |
| 6,829,132 | B2 | 12/2004 | Martin et al. |
| 7,123,216 | B1 | 10/2006 | Miles |
| 7,138,984 | B1 | 11/2006 | Miles |
| 7,280,265 | B2 | 10/2007 | Miles |
| 7,327,510 | B2 | 2/2008 | Cummings et al. |
| 7,369,294 | B2 | 5/2008 | Gally et al. |
| 2002/0075555 | A1 | 6/2002 | Miles |
| 2003/0112507 | A1 | 6/2003 | Divelbiss et al. |
| 2003/0117382 | A1 | 6/2003 | Pawlowski et al. |
| 2003/0128197 | A1 | 7/2003 | Turner et al. |
| 2004/0024580 | A1 | 2/2004 | Salmonsen et al. |
| 2005/0057191 | A1* | 3/2005 | Jo et al. ............ 315/291 |
| 2006/0066503 | A1 | 3/2006 | Sampsell et al. |
| 2006/0066504 | A1 | 3/2006 | Sampsell et al. |
| 2006/0066541 | A1 | 3/2006 | Gally et al. |
| 2006/0066595 | A1 | 3/2006 | Sampsell et al. |
| 2006/0066596 | A1 | 3/2006 | Sampsell et al. |
| 2006/0066876 | A1 | 3/2006 | Kothari |
| 2006/0067028 | A1 | 3/2006 | Floyd |
| 2006/0077393 | A1 | 4/2006 | Gally et al. |
| 2006/0077521 | A1 | 4/2006 | Gally et al. |
| 2006/0077617 | A1 | 4/2006 | Floyd |
| 2006/0176241 | A1 | 8/2006 | Sampsell |
| 2007/0023851 | A1 | 2/2007 | Hartzell et al. |
| 2007/0200839 | A1 | 8/2007 | Sampsell |
| 2007/0242008 | A1 | 10/2007 | Cummings |
| 2008/0094320 | A1* | 4/2008 | Parikh et al. ............ 345/76 |
| 2009/0009847 | A1 | 1/2009 | Sasagawa et al. |
| 2009/0126777 | A1* | 5/2009 | Khazeni et al. ............ 136/246 |
| 2009/0141286 | A1 | 6/2009 | Kothari |

FOREIGN PATENT DOCUMENTS

| | | |
|---|---|---|
| EP | 1 640 764 | 3/2006 |
| EP | 1 640 776 | 3/2006 |
| EP | 1 640 779 | 3/2006 |
| WO | WO 2004/066256 | 8/2004 |
| WO | WO 2005/066596 | 7/2005 |

OTHER PUBLICATIONS

Miles, "A New Reflective FPD Technology Using Interferometric Modulation," Journal of the SID 5/4, 1997, pp. 379-382.

Miles et al., 10.1: Digital Paper™ for reflective displays, SID 02 Digest, pp. 115-117, 2002.

Winton, John M., "A novel way to capture solar energy," Chemical Week, pp. 17-18 (May 15, 1985).

Wu, "Design of a Reflective Color LCD Using Optical Interference Reflectors," ASIA Display '95, pp. 929-931 (Oct. 16, 1995).

Mark W. Miles, "MEMS-based interferometric modulator for display applications," Proceedings of SPIE, vol. 3876, Aug. 1999, pp. 20-28.

* cited by examiner

PRIOR ART

*PRIOR ART*

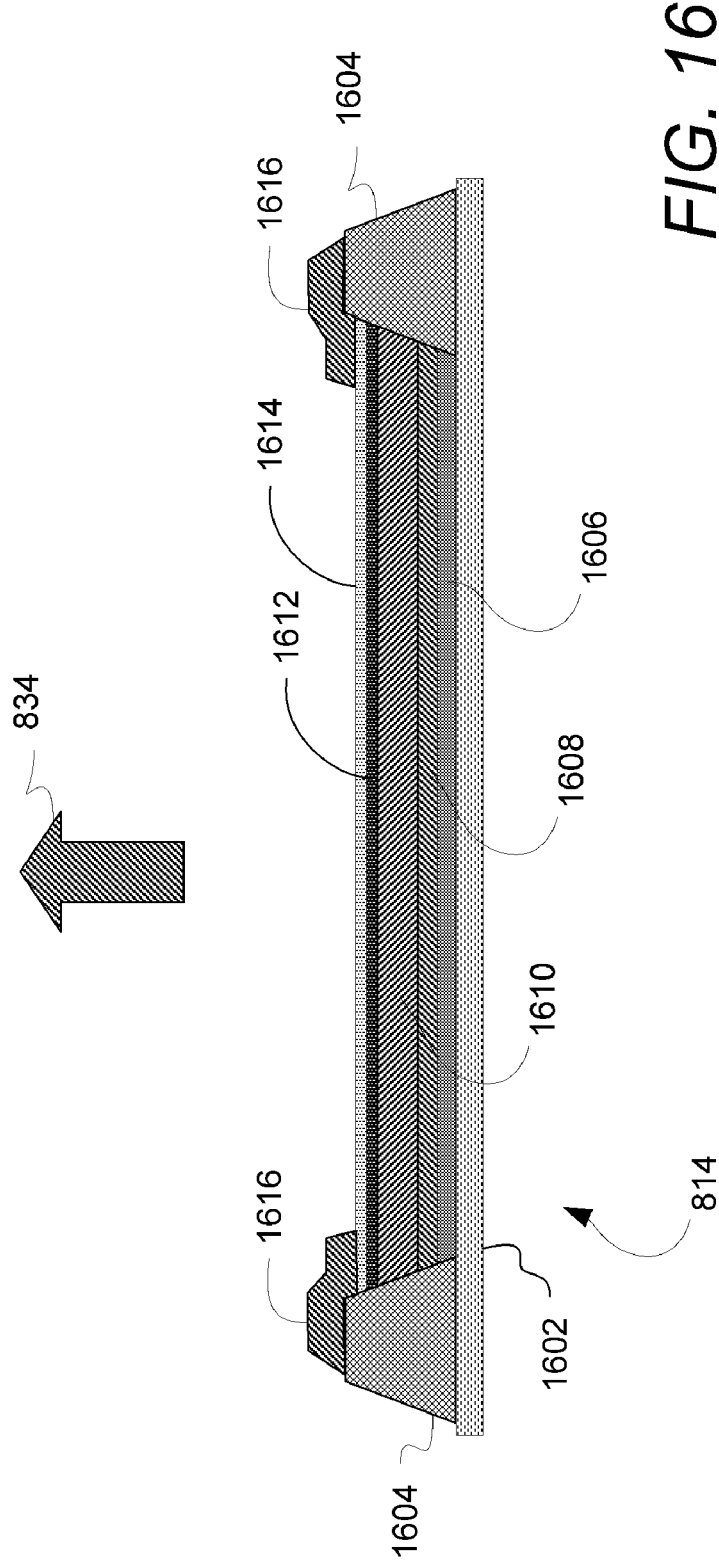

APPARATUS AND METHOD OF DUAL-MODE DISPLAY

FIELD OF THE INVENTION

The field of the invention relates to display systems.

DESCRIPTION OF THE RELATED TECHNOLOGY

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a movable mirror. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one will understand how the features of this invention provide advantages that include a reflective display that is both bright and provides saturated colors in low and high ambient lighting conditions One embodiment comprises a display. The display comprises at least one reflective display element configured to display a pixel of an image and at least one emissive display element configured to display the pixel. Each of the reflective display element and the emissive display element are configured to display the pixel based on ambient lighting conditions.

One embodiment comprises a display. The display comprises a reflective display element configured to display a portion of an image, an emissive display element configured to display the portion of the image, and a circuit configured to selectively provide signals indicative of the portion of the image to at least one of the reflective display element and the emissive display element.

One embodiment comprises a device for outputting light. The device comprises means for outputting light based on a voltage difference applied to the first display element, means for outputting light based on a current applied to the second display element, and means for supplying the current to the second display element and for supplying the voltage difference to the first display element based on a first voltage level indicative of a portion of an image. The supplying means is configured to selectively supply the current based on a second voltage level.

One embodiment comprises method of operating a display. The method comprises applying a voltage difference across a first display element based on a first voltage level indicative of a portion of an image, and selectively applying a current across a second display element based at least partly on the first voltage level and based at least partly on a second voltage level. The voltage difference is applied so that the first display element substantially absorbs incident light when the current is below a specified level and reflects light when the current exceeds the specified level.

BRIEF DESCRIPTION OF THE DRAWINGS

FIG. 16 is a cross-section diagram illustrating one embodiment of a suitable emissive display element for use in a display as illustrated in FIG. 8.

DETAILED DESCRIPTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Display devices that have high contrast and low power consumption in bright ambient lighting conditions and vivid, or highly saturated, colors in dimmer ambient lighting conditions are desirable in many applications. One embodiment includes a display device comprising a reflective interferometric modulator display element and an emissive display element that can be configured to have high contrast and low power consumption in bright ambient lighting conditions and vivid, or highly saturated, colors in dimmer ambient lighting conditions. In one such embodiment, an active matrix provides a simple, efficient drive for such devices. Other embodiments include a method of driving such devices.

Figure 1:
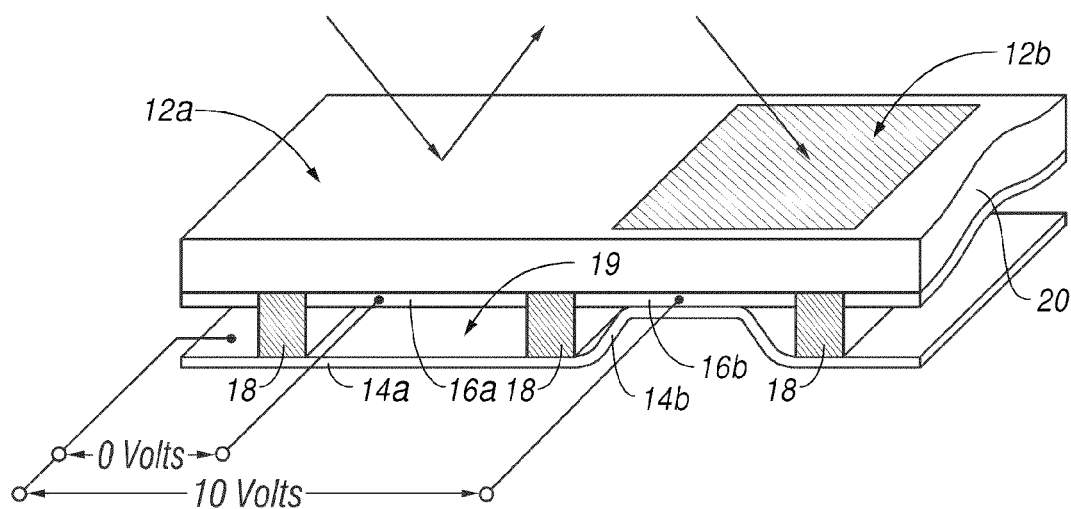
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
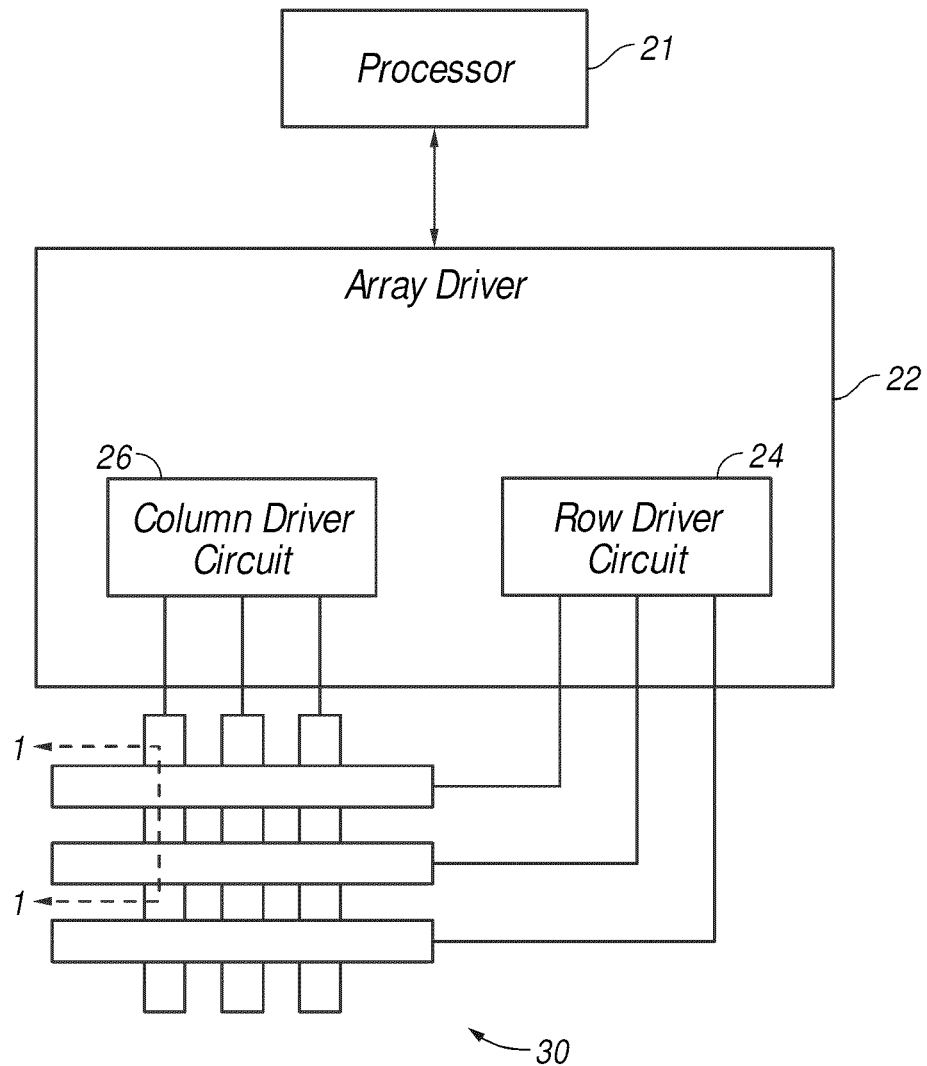
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
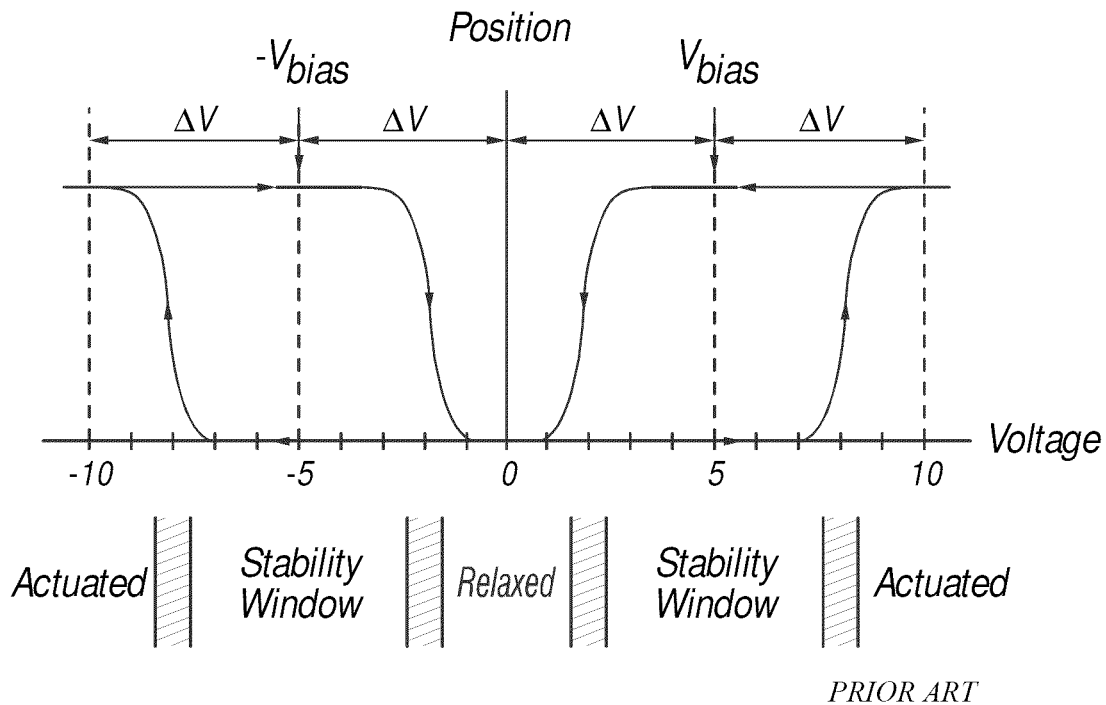
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
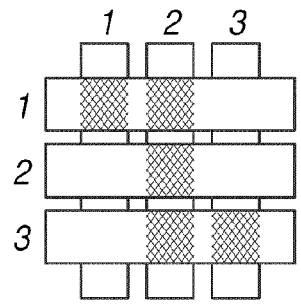
FIGS. 5A and 5B illustrate one exemplary timing diagram for row and column signals that may be used to write a frame of display data to the 3×3 interferometric modulator display of FIG. 2.
Figure 5B:
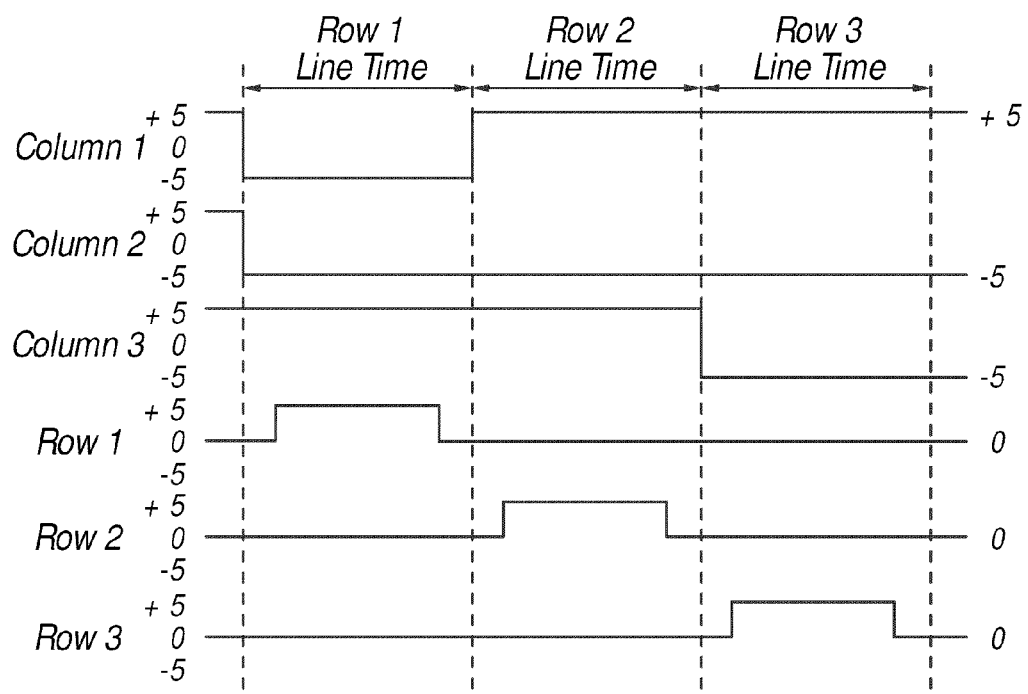

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
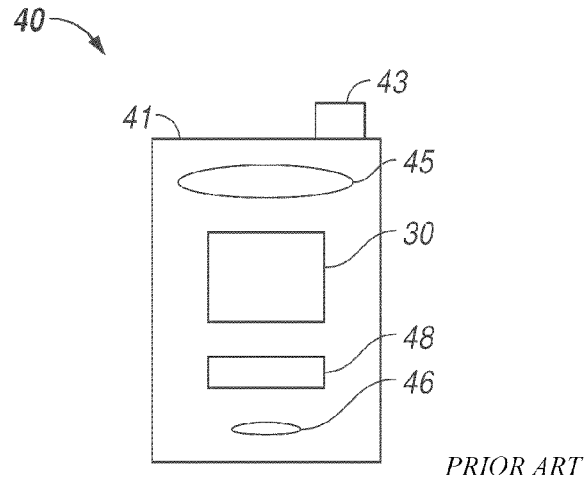
FIGS. 6A and 6B are system block diagrams illustrating an embodiment of a visual display device comprising a plurality of interferometric modulators.
Figure 6B:
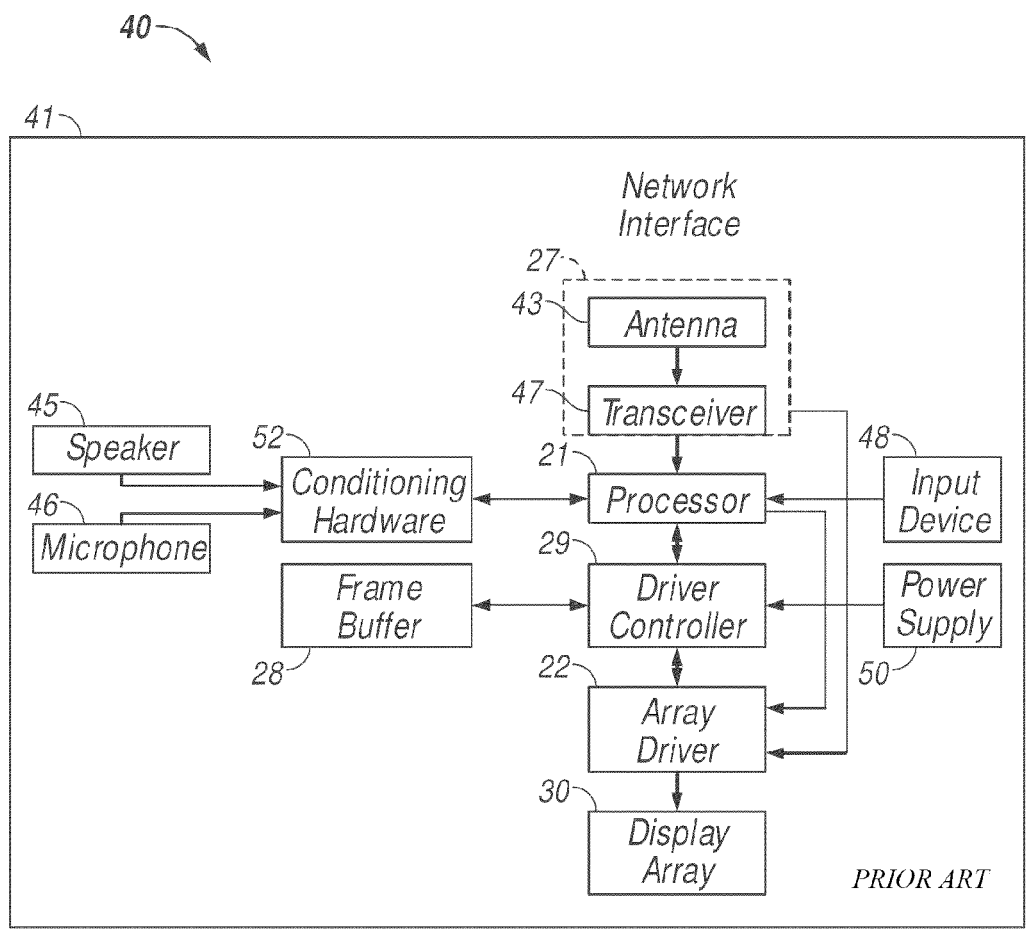

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
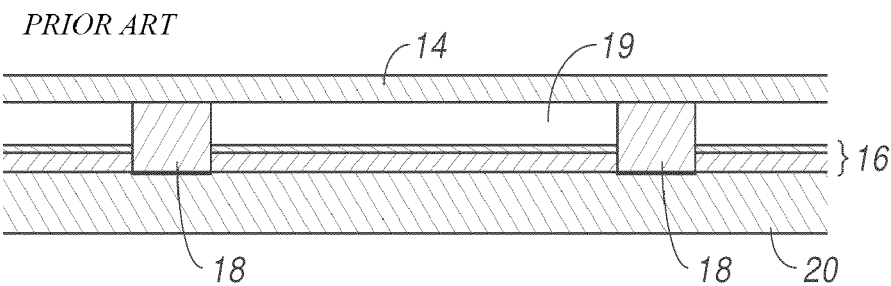
FIG. 7A is a cross section of the device of FIG. 1.
Figure 7B:
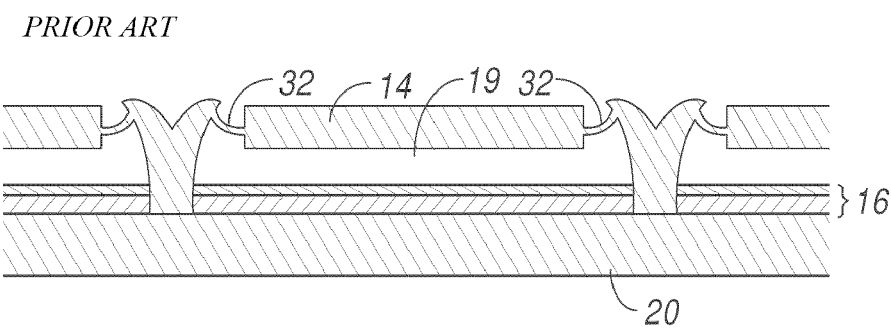
FIG. 7B is a cross section of an alternative embodiment of an interferometric modulator.
Figure 7C:
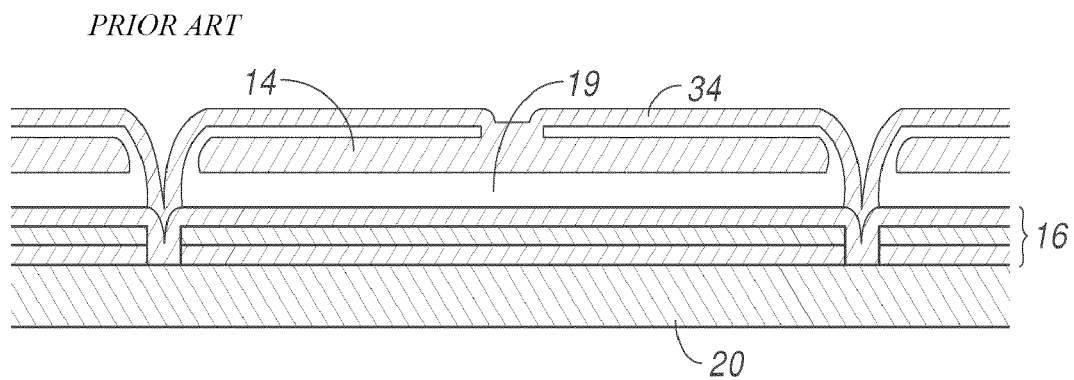
FIG. 7C is a cross section of another alternative embodiment of an interferometric modulator.
Figure 7D:
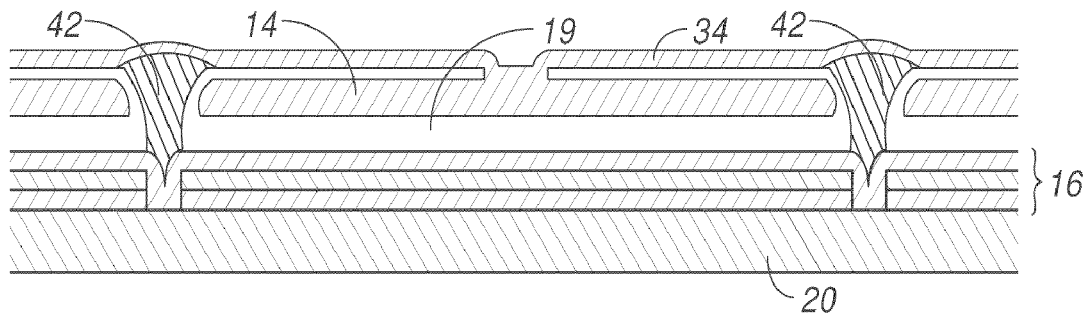
FIG. 7D is a cross section of yet another alternative embodiment of an interferometric modulator.
Figure 7E:
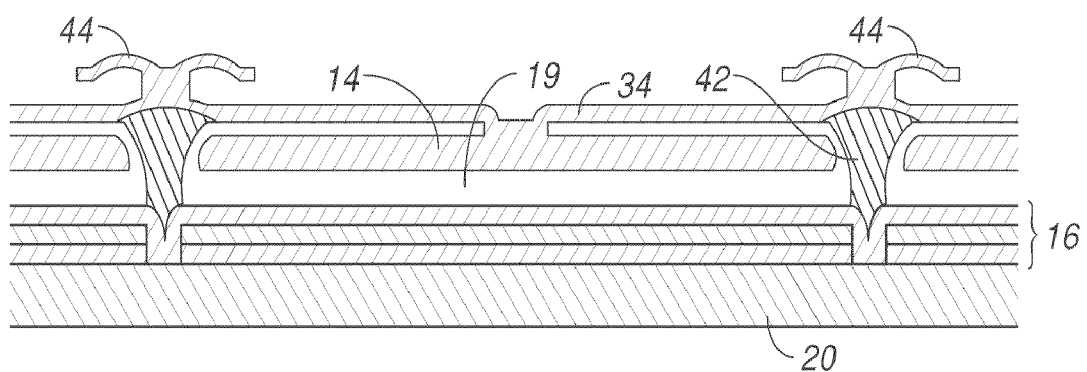
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

In one embodiment, interferometric light modulators 12, such as disclosed with reference to FIGS. 1 to 7A-7E, may be used in combination with emissive display elements. For example, a display may include pixels that each comprise an interferometric light modulator and an emissive display element such as an organic light emitting diode (OLED). In bright ambient lighting conditions, the OLED of each pixel is turned off so that the display forms an image using the interferometric light modulators of each pixel. In dim ambient lighting conditions, the OLED of each pixel is provided a current indicative of the corresponding portion of the image. When the OLED is active, the interferometric modulator can be positioned in a dark or non-reflective state. In one embodiment, the interferometric modulator can be used in addition to the OLED, e.g., positioned in a bright or reflective state when the OLED is outputting bright light. In some embodiments, the use of OLEDs in dim lighting conditions can provide bright, saturated colors using less power than using a front light to illuminate the light modulators. In one embodiment, the device 40 may comprise a light sensor that senses the ambient light conditions for driving the display accordingly. In one embodiment, the display may be operated based on user input or user settings indicative of, or overriding, ambient lighting conditions.

Figure 8:
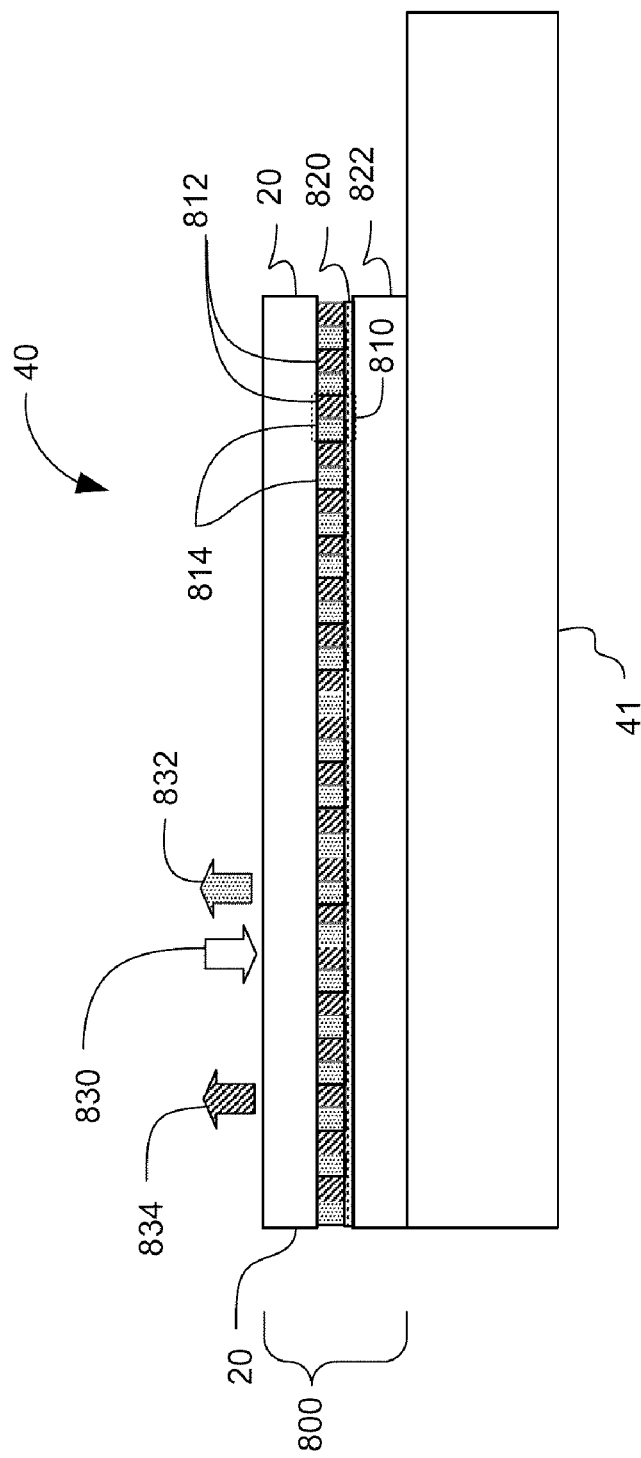
FIG. 8 is a cross-section diagram illustrating one embodiment of a device comprising an example of a display that includes interferometric modulators and emissive display elements.

FIG. 8 is a cross-section diagram illustrating one embodiment of a device 40 comprising an example of a display 800 comprising pixels 810 that each include an interferometric modulator 812 and an emissive display element, e.g., an OLED 814. In the illustrated example, the interferometric modulators 812 and the OLEDs 814 are formed between the substrate 20 and an encapsulation layer 822. An active matrix backplane 820 is formed between the interferometric modulators 812 and the OLEDs 814 and the encapsulation layer 822. In one embodiment, the active-matrix backplane 820 comprises planarized TFTs that form switching and driver elements shared by the modulators 812 and the OLEDs 814. As illustrated, the light modulators 812 are configured to modulate incident light 830 and output light 832. The OLEDs 814 are configured to emit light 832. The OLEDs 814 can be operated at a range of different ambient light levels, concurrently with the light modulators 812 or with the light modulators 812 in a dark state.

The active matrix layer 820 may be formed using conventional semiconductor manufacturing techniques such as photolithography, deposition, masking, etching (e.g., dry methods such as plasma etch and wet methods), etc. Deposition may include "dry" methods such as chemical vapor deposition (CVD, including plasma-enhanced CVD and thermal CVD) and sputter coating, and wet methods such as spin coating.

Figure 9:
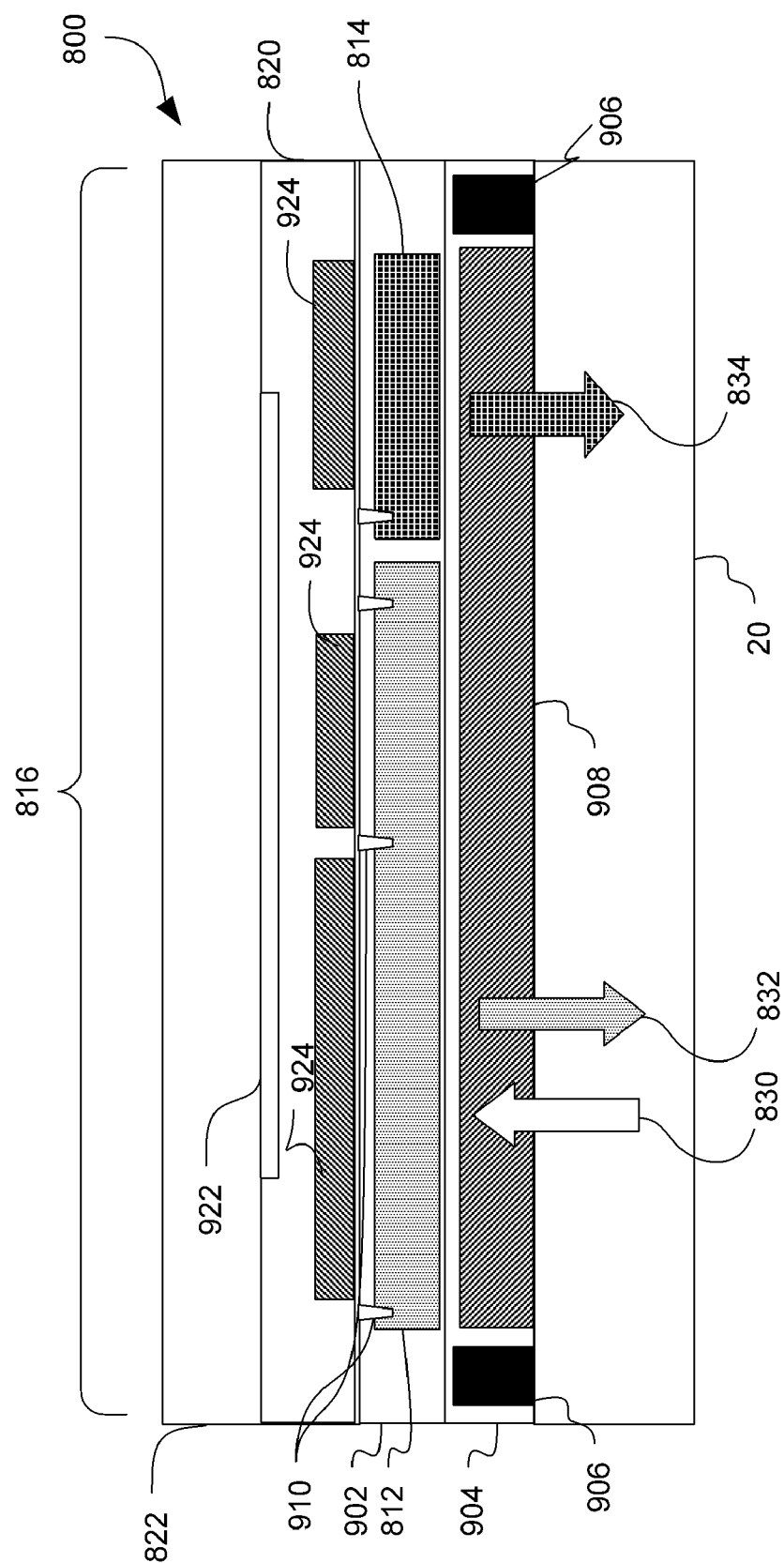
FIG. 9 is a cross section diagram illustrating in more detail an example of the display illustrated in FIG. 8.

FIG. 9 is a cross section diagram illustrating in more detail an example of the display 800 from FIG. 8. The illustrated portion of the display 800 includes one of the pixels 816 that includes the interferometric light modulator 812 and the OLED 814. Note that with reference to FIG. 8, the substrate 20 is illustrated at the bottom of the page. In the example of FIG. 9, the display 800 includes one or more planarization layers such as a planarization layer 902 formed on or above the interferometric light modulator 812 and the OLED 814. One or more holes or vias 910 may be formed through the planarization layer 902 into one or both of the interferometric light modulator 812 and the OLED 814 to allow, for example, etching of sacrificial layers, such as used in forming the interferometric modulator 812, after deposition of the planarization layer 902. In addition, the via holes 910 may be used for interconnection between the active matrix layer 820 (TFT, MEMS switch, etc.), which are over the planarization layer 902 and the modulators 812 and the OLED 814, which are under the planarization layer 902.

In the illustrated example of the pixel 816, the interferometric light modulator 812 and the OLED 814 are formed along a horizontal plane. The relative area of the interferometric light modulator 812 and the OLED 814 may vary between different embodiments to provide different trade-offs between the fill factor between the interferometric light modulator 812 and the OLED 814. For example, the area of the "active-emissive" OLED 814 can be selected to be relatively small but driven using a higher current to produce a desired brightness. The "passive-reflective" area of the interferometric light modulator 812 can be selected to increase brightness and contrast-ratio. The planarization layer or layers 902 can be used to encapsulate each of the interferometric light modulator 812 and the OLED 814 to allow different processes to be used for forming each. In addition, the planarization layer 902 can be further used to allow a different process to also be used to form the active matrix layer 820.

The display 800 may further include one or more planarization layers such as a planarization layer 904 formed on or above optical elements such as a black mask 906 and one or more color filters 908. The layer 904 may include other optical components for controlling the optical properties of the interferometric light modulator 812 and/or the OLED 814, including, for example, diffusers, light guides, etc.

The active matrix layer 820 may include one or more elements 924 that may include active or passive elements such as thin film transistors (TFTs), capacitors, and wiring elements connected to one or both of the interferometric light modulator 812 and the OLED 814. A desiccant layer 922 may be formed over portions of the active matrix layer 820, between the active matrix layer 820 and the encapsulation layer 822. The encapsulation layer 822 may comprise a layer of glass or other material that is deposited or applied on or above the active matrix layer 820. Desirably, the desiccant layer 922 may be formed similar to that used in modulator arrays 30 that do not include the OLED 814.

Figure 10:
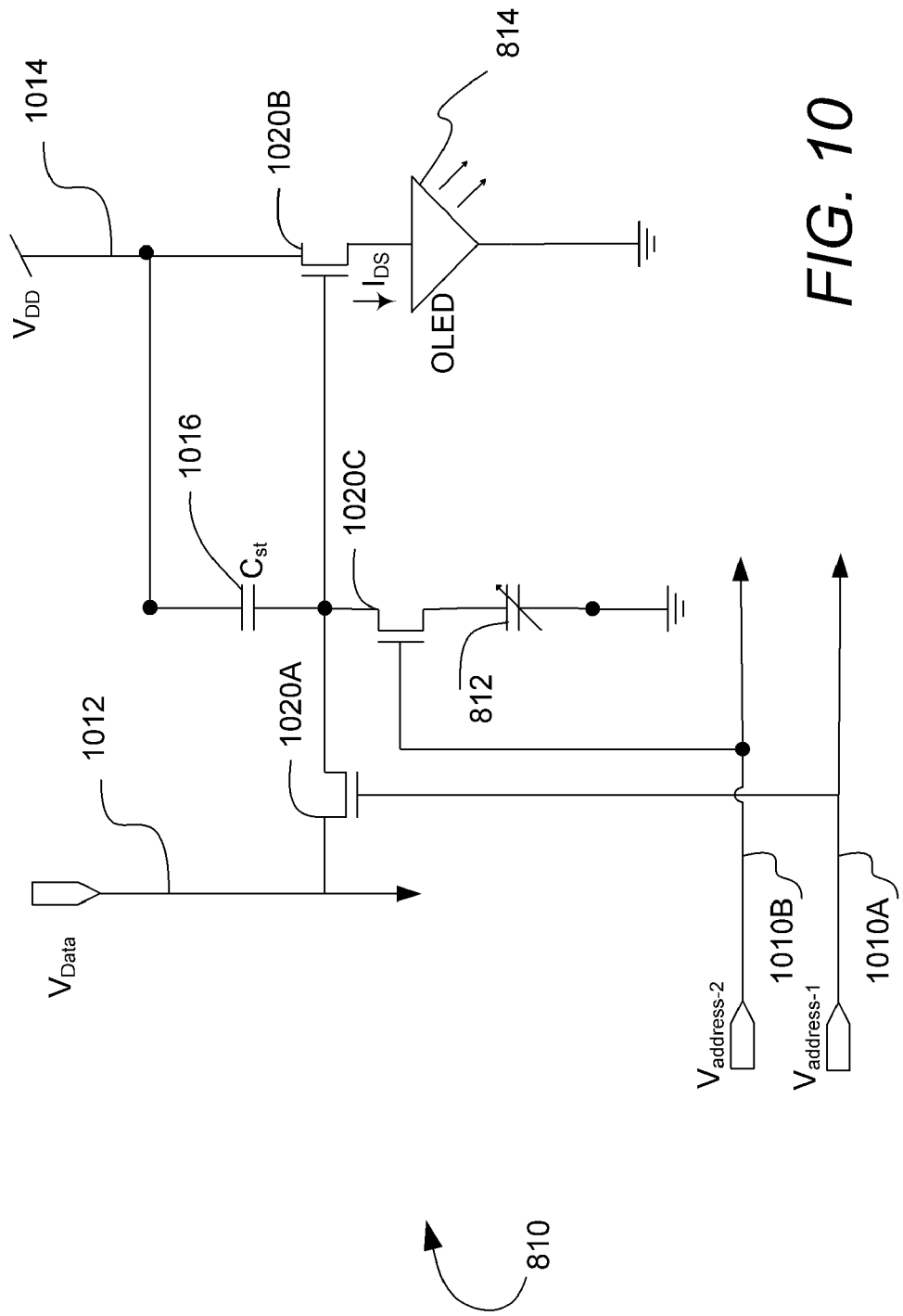
FIG. 10 is a schematic diagram that illustrates one example of a circuit for driving a pixel in a display such as illustrated in FIG. 9.

FIG. 10 is a schematic diagram that illustrates one example of a circuit for driving the pixel 810. The example circuit of FIG. 10 includes two data signals Vaddress-1 and Vaddress-2 along address lines 1010A and 1010B, respectively. The address lines 1010A and 1010B may connect a line of pixels (e.g., a row of pixels) to, for example, the row driver circuit 24 of FIG. 2. A data line 1012 provides a data signal Vdata to the pixel 810. The data line 1012 may connect a second line of pixels (e.g., a column of pixels) to, for example, the column driver circuit 26 of FIG. 2. A supply voltage $V_{DD}$ is also supplied to each pixel via a supply line 1014. The supply voltage $V_{DD}$ may be common to a row of pixels 810, a column of pixels 810, or substantially all of the pixels 810 of the display 800.

Transistors 1020A, 1020B and 1020C control the output of the interferometric light modulator 812 and the OLED 814 based on the signals Vaddress-1, Vaddress-2, Vdata, and $V_{DD}$. A storage capacitor 1016, labeled, Cst, is used to hold a constant voltage (Vdata) to the gate electrode of transistor 1020B, to maintain a constant current, $I_{DS}$, to the OLED 814, when the switching transistor 1020A is turned off for the rest of line time. The transistor 1020A has its drain connected to Vdata via the data line 1012, its gate to Vaddress-1 via the address line 1010A, and its source to the gate of the current drive transistor 1020B. The transistor 1020C has its gate connected to Vaddress-2 via the address line 1010B, its drain connected to a first electrode of the storage capacitor 1016 and the gate of transistor 1020B, and its source to ground via the interferometric modulator 812. The storage capacitor 1016 has its second electrode connected to $V_{DD}$ and the drain of the drive transistor 1020B. The source of the transistor 1020B provides the drive current, $I_{DS}$, to the OLED 814. In this configuration, the transistor 1020A acts as a shared switching element.

Table 1 illustrates the values of Vaddress-1, Vaddress-2, and $V_{DD}$ to drive the modulator 812 and the OLED 814 to various output states. In one embodiment, for example in bright ambient light (or in low ambient light), $V_{DD}$ is set to a relatively low voltage level and each of the address lines, Vaddress-1 and Vaddress-2 are set to a relatively high voltage level such that the modulator 812 is "on" in that it has a reflective or non-reflective state determined by Vdata while the OLED 814 is off. When Vaddress-2 is set to a low voltage, $V_{DD}$ is set to a high voltage such that the modulator 812 is positioned to a non-reflective state and the OLED 814 is driven with a current that is proportional to Vdata.

TABLE 1

| Lighting Conditions | Vaddress-1 | Vaddress-2 | $V_{DD}$ |
|---|---|---|---|
| Bright (OLED off) | High | High | Low |
| Dim (OLED on) | High | Low | High |

Figure 11:
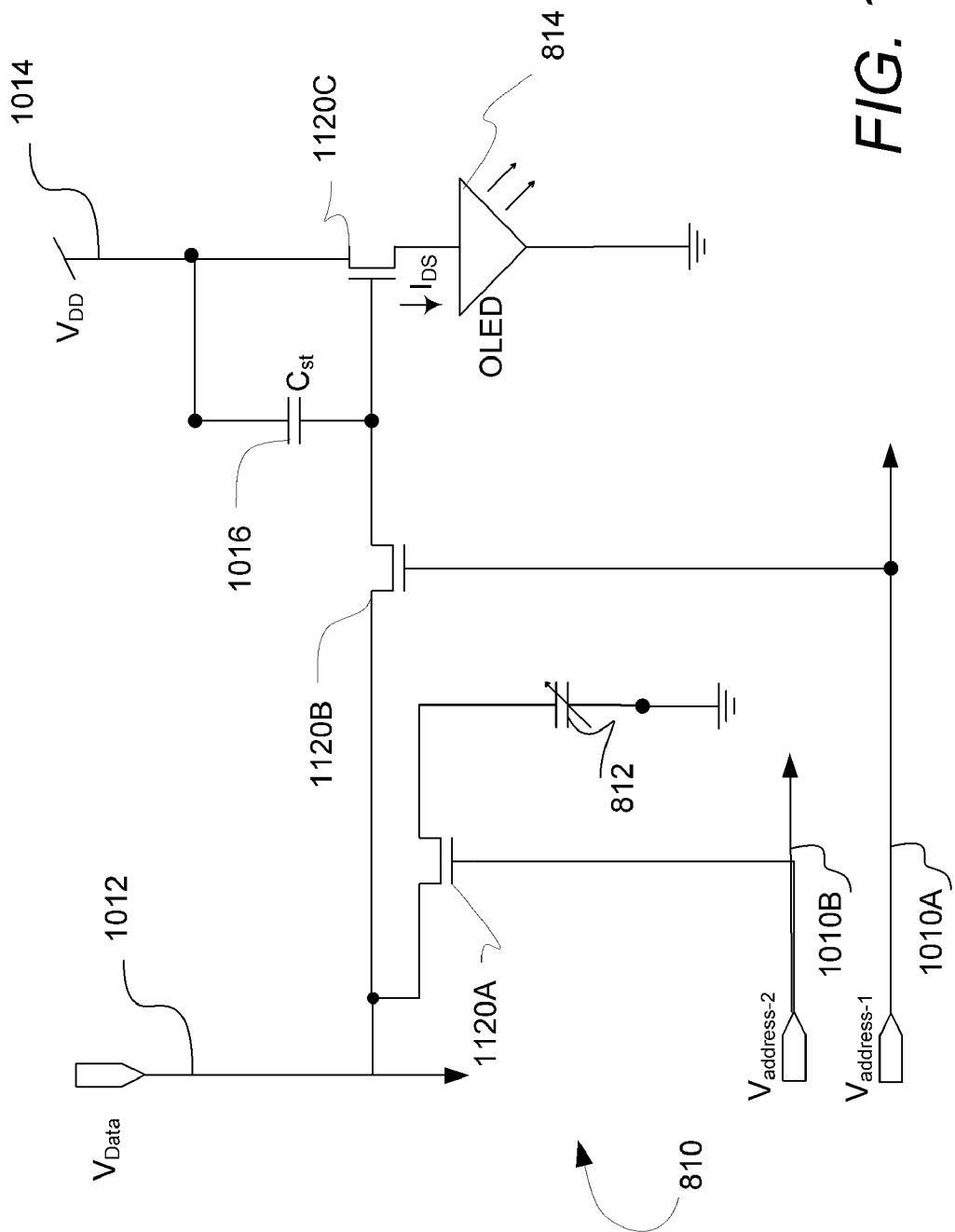
FIG. 11 is a schematic diagram illustrating another example of a circuit for driving a pixel in a display such as illustrated in FIG. 9.

FIG. 11 is a schematic diagram illustrating another example of a circuit for driving the pixel 810. FIG. 11 is similar to FIG. 10 except that two transistors 1120A and 11020B individually switch between use of the modulator 812 and the OLED 814. In particular, transistors 1120A, 1120B and 1120C control the output of the interferometric light modulator 812 and the OLED 814 based on the signals Vaddress-1, Vaddress-2, Vdata, and $V_{DD}$. The storage capacitor 1016 is used to supply the current, $I_{DS}$, to the OLED 814 in conjunction with the transistor 1020C. The transistor 1120A has its drain connected to Vdata via the data line 1012, its gate to Vaddress-2 via the address line 1010B, and its source to ground via the modulator 812. The transistor 1120B also has its drain connected to Vdata via data line 102. The gate of the transistor 1120B is connected to Vaddress-1 via the address line 1010A. The source of the transistor 1120B is connected to the gate of the driver transistor 1120C and the storage capacitor 1016. The storage capacitor 1016 has its second electrode connected to $V_{DD}$ and the drain of the drive transistor 1120C. The source of the transistor 1120C provides the drive current, $I_{DS}$, to the OLED 814.

Table 2 illustrates the values of Vaddress-1, Vaddress-2, and $V_{DD}$ to drive the modulator 812 and the OLED 814 to various output states. In one embodiment, for example in bright ambient light (or in low ambient light), $V_{DD}$ is set to a relatively low voltage level and the address lines Vaddress-2 is set to a relatively high voltage level such that the modulator 812 is "on" in that it has a reflective or non-reflective state determined by Vdata while the OLED 814 is off. When Vaddress-1 is set to a high voltage, $V_{DD}$ is set to a high voltage such that the modulator 812 is positioned to a non-reflective state and the OLED 814 is driven with a current that is proportional to Vdata.

TABLE 2

| Lighting Conditions | Vaddress-1 | Vaddress-2 | VDD |
|---|---|---|---|
| Bright (OLED off) | Low | High | Low |
| Dim (OLED on) | High | Low | High |

Figure 12:
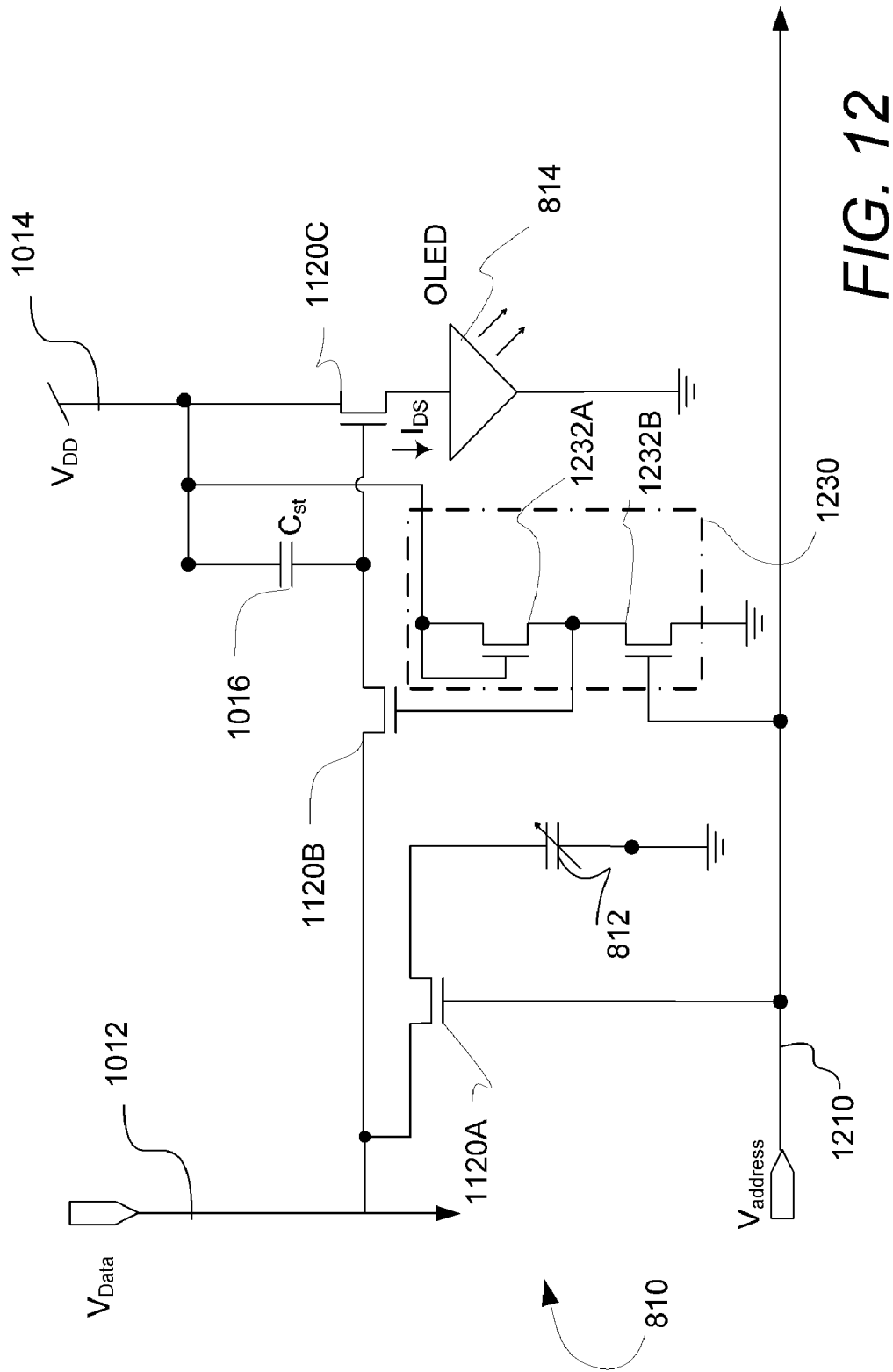
FIG. 12 is schematic diagram illustrating another example of a circuit for driving a pixel in a display such as illustrated in FIG. 9.

FIG. 12 is a schematic diagram illustrating another example of a circuit for driving the pixel 810. FIG. 12 is similar to FIG. 11 except that only a single address line 1210 connects the pixel 810 to one address signal, Vaddress. The gate of the transistor 1120A is instead connected to the address line 1210. Instead of a second address line, the transistor 1120B is instead connected to the address line 1210 via an inverter circuit 1230. The inverter circuit 1230 comprises transistors 1232A and 1232B connected in series with the source of the transistor 1232A connected to the drain of the transistor 1232B. The gate of transistor 1232B is connected to the address line 1210 and the drain of transistor 1232 is connected to ground. The drain and gate of the transistor 1232A are connected to $V_{DD}$. The transistor 1120B is connected to the inverter circuit 1230 at the connection between the source of the transistor 1232A and the drain of the transistor 1232B.

Table 3 illustrates the values of Vaddress and $V_{DD}$ to drive the modulator 812 and the OLED 814 to various output states. In one embodiment, for example in bright ambient light (or in low ambient light), $V_{DD}$ is set to a relatively low voltage level and the address lines Vaddress is set to a relatively high voltage level such that the modulator 812 is "on" in that it has a reflective or non-reflective state determined by Vdata while the OLED 814 is off. When Vaddress is set to a low voltage, $V_{DD}$ is set to a high voltage such that the modulator 812 is positioned to a non-reflective state and the OLED 814 is driven with a current that is proportional to Vdata. In one embodiment, the circuit illustrated in FIG. 12 has fewer connections between the display 800 and the array driver 22 (of FIG. 2) than the example illustrated with reference to FIG. 11.

TABLE 3

| Lighting Conditions | Vaddress | $V_{DD}$ |
|---|---|---|
| Bright (OLED off) | High | Low |
| Dim (OLED on) | Low | High |

Figure 13:
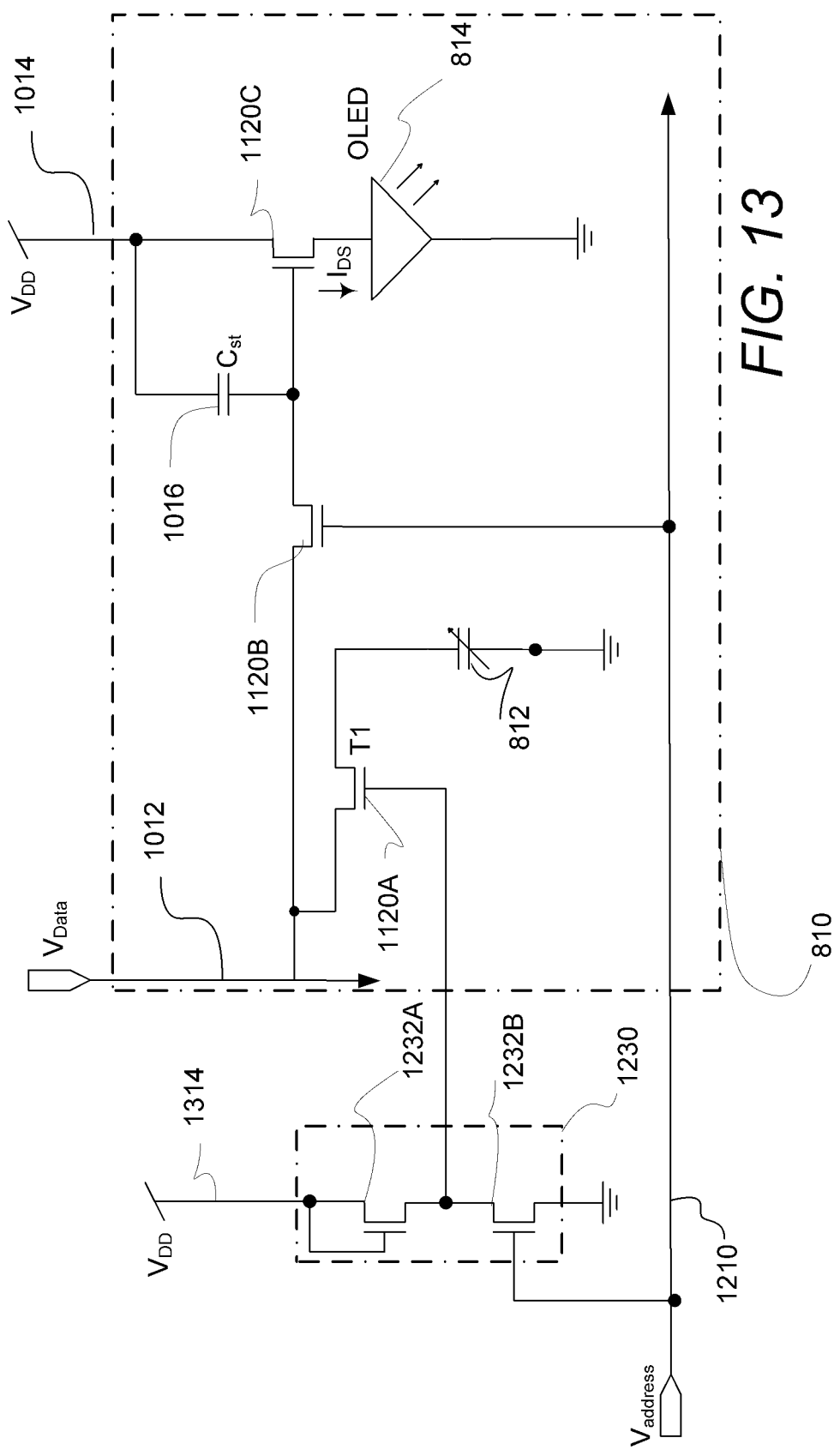
FIG. 13 is a schematic diagram illustrating another example of a circuit for driving a pixel in a display such as illustrated in FIG. 9.

FIG. 13 is a schematic diagram illustrating another example of a circuit for driving the pixel 810. FIG. 12 is similar to FIGS. 10 and 11 except that the inverter 1230 is positioned on the substrate 20 outside of the area of the pixel 810. Thus, the number of address lines is reduced without adding additional transistors to each pixel 810 in the display area. The transistors 1120A, 1120B, and 1120C of the example circuit of FIG. 13 are connected in a similar manner as in FIG. 11 except that the gate of the transistors 1120A is connected to the inverter circuit 1230 instead of a second address line. The example of the inverter circuit 1230 of FIG. 13 is similar to the example of the inverter circuit 1230 illustrated with reference to FIG. 12 except that it is formed outside of the area of the pixel, e.g., elsewhere on the substrate 20, and the drain of the transistor 1232A is connected to $V_{DD}$ via a separate supply line 1314.

Table 4 illustrates the values of Vaddress and $V_{DD}$ to drive the modulator 812 and the OLED 814 to various output states. In one embodiment, for example in bright ambient light (or in low ambient light), $V_{DD}$ is set to a relatively low voltage level and the address line, Vaddress, is also set to a relatively low voltage level such that the modulator 812 is "on" in that it has a reflective or non-reflective state determined by Vdata while the OLED 814 is off. When Vaddress is set to a high voltage, $V_{DD}$ is set to a high voltage such that the modulator 812 is positioned to a non-reflective state and the OLED 814 is driven with a current that is proportional to Vdata. In one embodiment, the circuit illustrated in FIG. 13 has fewer connections between the display 800 and the array driver 22 (of FIG. 2) than the example illustrated with reference to FIG. 11.

TABLE 4

| Lighting Conditions | Vaddress | $V_{DD}$ |
|---|---|---|
| Bright (OLED off) | Low | Low |
| Dim (OLED on) | High | High |

Figure 14:
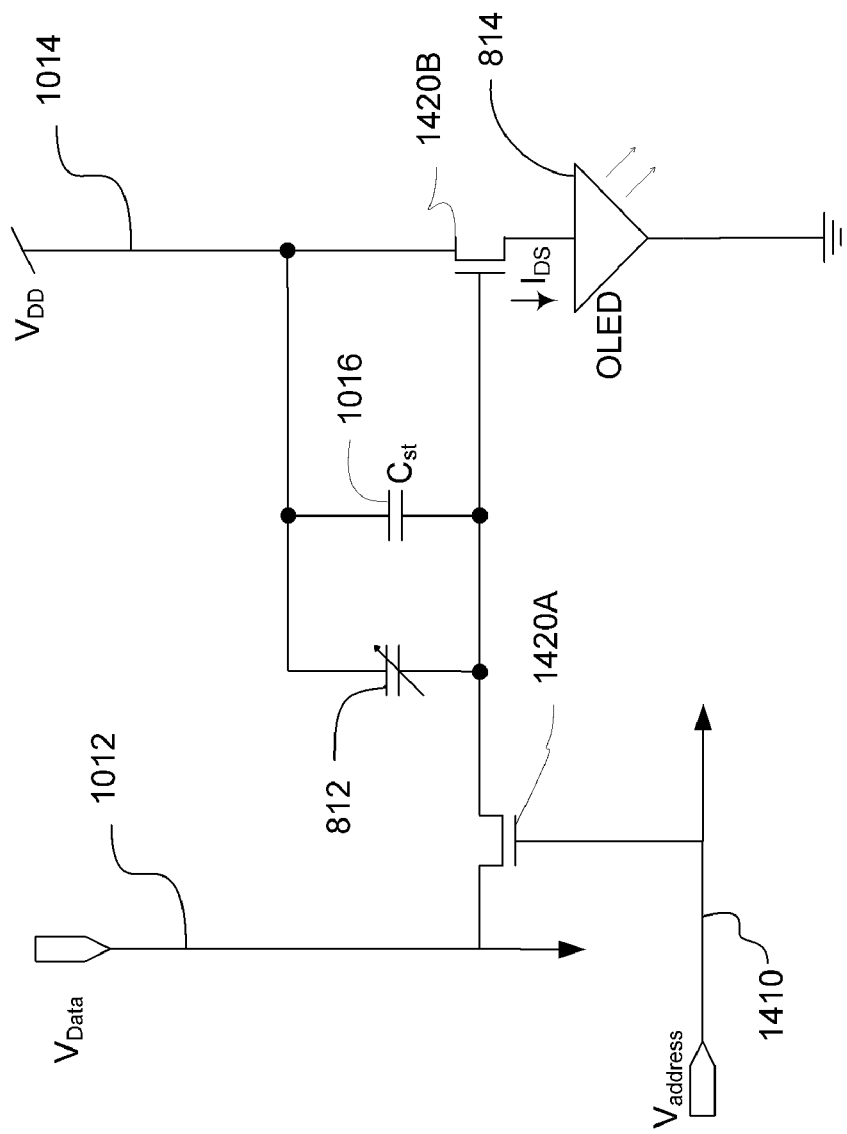
FIG. 14 is a schematic diagram illustrating another example of a circuit for driving a pixel in a display such as illustrated in FIG. 9.

FIG. 14 is a schematic diagram illustrating another example of a circuit for driving the pixel 810. FIG. 14 is similar to FIGS. 11-12 except that no inverter circuit 1230 is used and the number of transistors is reduced to two per pixel, e.g., transistors 1420A and 1420B. The transistor 1420A acts to switch operating mode while the transistor 1420B, in conjunction with the storage capacitor 1016, provides the drive current, $I_{DS}$ to the OLED 814 via its source. The interferometric modulator 812 and the storage capacitor 1016 are connected in parallel between the drive voltage $V_{DD}$ and the source of the transistor 1420A. The storage capacitor 1016 in this example circuit can be configured to reduce crosstalk and reduce the feed-through voltage for driving the modulator 812. Thus, the storage capacitor 1016 can replace a capacitor that might otherwise be used for such functions in various embodiments to further reduce components.

The source of the transistor 1420A is also connected to the gate of the drive transistor 1420B. The data signal, Vdata, is connected via the data line 1012 to the drain of the transistor 1420A. The address signal, Vaddress, is connected via an address line 1410 to the gate of the transistor 1420A.

Table 5 illustrates the values of the Vaddress, and $V_{DD}$ to drive the modulator 812 and the OLED 814 to various output states. In one embodiment, in bright ambient light, $V_{DD}$ is set to a relatively low voltage level and the address line, Vaddress, is also set to a relatively high voltage level such that the modulator 812 is "on" in that it has a reflective or non-reflective state determined by Vdata while the OLED 814 is off. When Vaddress is set to a high voltage level and $V_{DD}$ is also set to a high voltage level, the OLED 814 is driven with a current that is proportional to Vdata². The modulator 812 is positioned in a non-reflective state when Vdata is below a threshold ($V_{DD}$-Vdata is large) and is positioned in a reflective state to enhance the brightness of the pixel 816 when Vdata is high (indicating a high brightness), e.g., when $V_{DD}$-Vdata is small. The embodiment illustrated with reference to FIG. 14 has fewer connections between the display 800 and the array driver 22 (of FIG. 2) and fewer transistors than the examples illustrated with reference to FIG. 10-13.

TABLE 5

| Lighting Conditions | $V_{DD}$ | Modulator 812 | OLED 814 | $I_{DS}$ | Vaddress |
|---|---|---|---|---|---|
| Bright (OLED off) | Low | indicative of Vdata | OFF | N/A | High |
| Dim (OLED on) | High | bright when Vdata is large | ON | ~Vdata² | High |

In the circuits of each of FIGS. 10-14, the brightness of the OLED 814 is proportional to T2 drain-to-source current of the drive transistor, e.g., (Vdata-$V_T$)², where $V_T$ is the threshold voltage of the drive transistor. The gray level (or color) of the modulator 812 may be controlled via temporal or spatial modulation.

Figure 15:
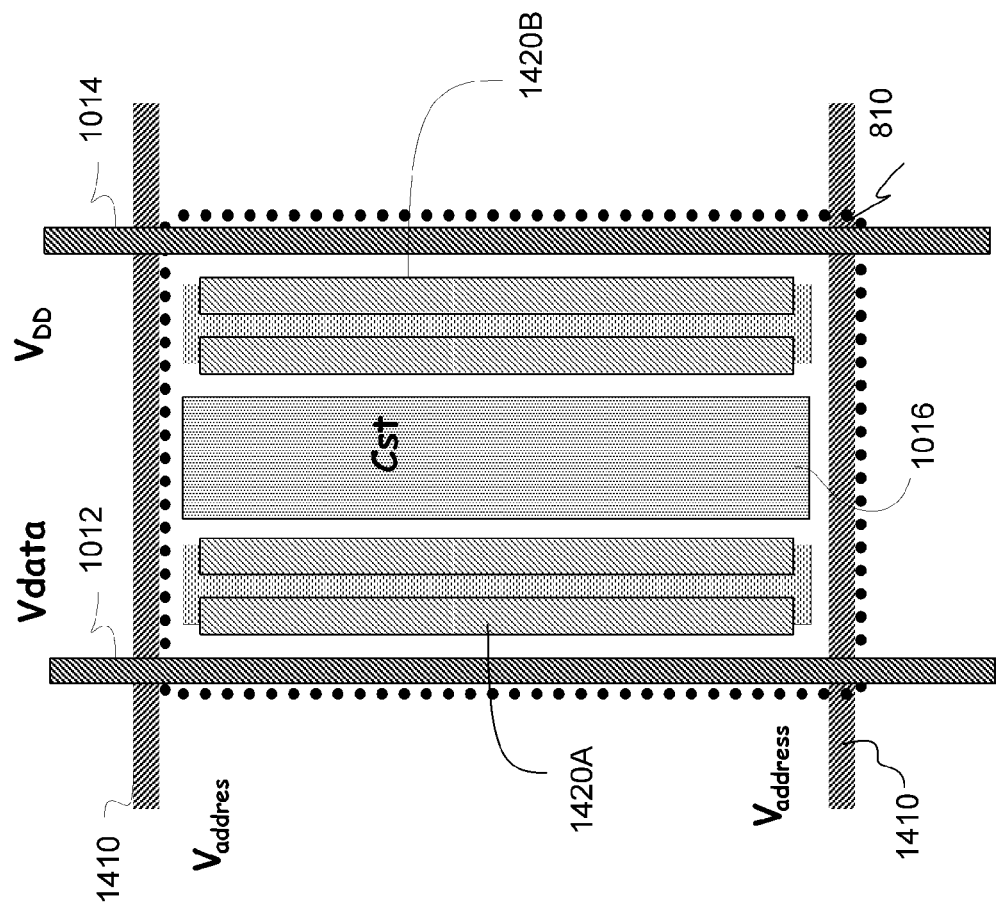
FIG. 15 is a view of the example of the pixel of FIG. 14 as viewed through its active matrix layer.

FIG. 15 is one view of the example of the pixel 816 of FIG. 14 as viewed through the active matrix layer 820. The pixel 814 is between the address line 1410 of the pixel 816 and the address line 1410 of the adjacent row of pixels and between the data line 1012 and the supply voltage line 1014. The transistors 1420A and 1420B are formed on either side of the storage capacitor 1016. The various junctions of TFT embodiments of the transistors 1420A and 1420B are also illustrated.

FIG. 16 is a cross-section diagram illustrating one embodiment of a suitable OLED 814. In one embodiment, one or more of the illustrated layers of the OLED 814 is formed using an inkjet printing process. The example of the OLED 814 comprises an optional reflector layer 1602 formed, for example, on the substrate 20 (not shown). The OLED 814 is defined on either edge with photoresist banks 1604 that are formed above the substrate 20 and the optional reflector layer 1602. An anode electrode 1606 is also formed above the substrate 20 and the optional reflector layer 1602. The anode electrode 1606 is formed, for example, of a substantially transparent conductor such as indium-tin-oxide (ITO). A buffer layer 1608 is formed on or above the anode electrode 1606. The buffer layer 1608 may comprise one or more of a hole transport layer (HTL) and an electron transport layer (ETL).

An electro-luminescent layer 1610 is formed on or above the buffer layer 1608. The electro-luminescent layer 1610 may comprise a polymer OLED (PLED) or small-molecule OLED (SM-OLED) layer. A transparent cathode 1612 is formed on or above the electro-luminescent layer 1610. The transparent cathode 1612 may also be formed of a transparent conductor such as ITO. A passivation layer or transparent conductive oxide film 1614 may optionally be formed on or above the transparent cathode 1612. Electrodes 1606, which may be configured to provide Vdata, $V_{DD}$, and Vaddress, may be formed on or above the passivation layer 1614 and/or the photoresist banks 1604.

In view of the above, one will appreciate that embodiments of the invention overcome the problem of providing a reflective display that is both bright and provides saturated colors in low and high ambient lighting conditions.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A device for outputting light, the device comprising:
a first display element configured to output light based on a voltage difference applied to the first display element;
a second display element configured to output light based on a current applied to the second display element; and
a circuit configured to supply the current to the second display element and to supply the voltage difference to the first display element based on a first voltage level indicative of a portion of an image, wherein the circuit is further configured to selectively supply the current based on a second voltage level indicative of the portion of the image.

2. The device of claim 1, wherein the first display element comprises an interferometric modulator configured to reflectively output light.

3. The device of claim 2, wherein the first display element is configured to substantially absorb incident light when the current is below a specified level and configured to reflect light when the current exceeds the specified level.

4. The device of claim 1, wherein the second display element comprises a light emitting diode.

5. The device of claim 4, wherein the light emitting diode comprises an organic light emitting diode.

6. The device of claim 1, wherein the circuit comprises an active matrix element.

7. The device of claim 1, wherein the first display element comprises a first electrode and a second electrode, wherein the output light is based on the voltage difference applied between the first and second electrode.

8. The device of claim 7, wherein the circuit comprises:
a capacitor connected in parallel to the first display element.

9. The device of claim 8, wherein the circuit further comprises:
a transistor having a gate connected to a first electrode of the capacitor, wherein the transistor is configured to provide the current to the second display element from an source of the transistor.

10. The device of claim 9, wherein the gate of the transistor is further connected to a first electrode of the first display element, wherein the first electrode of the capacitor, the first electrode of the first display element, and the gate of the transistor are configured to receive the first voltage level indicative of the portion of the image, and wherein a second electrode of the first display element, a second electrode of the capacitor, and a drain of the transistor are configured to receive the second voltage level.

11. The device of claim 1, further comprising:
a processor that is configured to communicate with the first and second display elements, the processor being configured to process image data; and
a memory device that is configured to communicate with the processor.

12. The apparatus of claim 11, further comprising a driver circuit configured to send at least one signal to the circuit.

13. The apparatus of claim 12, further comprising a controller configured to send at least a portion of the image data to the driver circuit.

14. The apparatus of claim 11, further comprising an image source module configured to send the image data to the processor.

15. The apparatus of claim 14, wherein the image source module comprises at least one of a receiver, transceiver, and transmitter.

16. The apparatus of claim 11, further comprising an input device configured to receive input data and to communicate the input data to the processor.

17. The device of claim 1, wherein the first display element is configured to reflectively output light indicative of the portion of the image and wherein the second display element is configured to emit light indicative of the portion of the image.

18. The device of claim 17, wherein the second display element is configured to output light from the device when the display element is configured to substantially absorb incident light.

19. The device of claim 1, wherein the portion of the image comprises a pixel.

20. A device for outputting light, the device comprising:
means for outputting light based on a voltage difference applied to the first display element;
means for outputting light based on a current applied to the second display element;
means for supplying the current to the second display element and for supplying the voltage difference to the first display element based on a first voltage level indicative of a portion of an image, wherein the supplying means is configured to selectively supply the current based on a second voltage level indicative of the first portion of the image.

21. The device of claim 20, wherein the means for outputting light based on a voltage difference comprises an interferometric modulator configured to reflectively output light.

22. The device of claim 21, wherein the interferometric modulator is configured to substantially absorb incident light when the current is below a specified level and configured to reflect light when the current exceeds the specified level.

23. The device of claim 20, wherein the means for outputting light based on a current comprises a light emitting diode.

24. The device of claim 23, wherein the light emitting diode comprises an organic light emitting diode.

25. The device of claim 20, wherein the supplying means comprises an active matrix element.

26. The device of claim 20, wherein the means for outputting light based on a voltage difference comprises a first electrode and a second electrode, wherein the output light is based on the voltage difference applied between the first and second electrode.

27. The device of claim 26, wherein the supplying means comprises:
a capacitor connected in parallel to the first display element.

28. The device of claim 27, wherein the supplying means further comprises:
a transistor having a gate connected to a first electrode of the capacitor, wherein the transistor is configured to provide the current from an source of the transistor.

29. The device of claim 28, wherein the gate of the transistor is further connected to the first electrode of the means for outputting light based on the voltage difference, wherein the first electrode of the capacitor, the first electrode of the means for outputting light based on the voltage difference, and the gate of the transistor are configured to receive the first voltage level indicative of a portion of the image, and wherein the second electrode of the means for outputting light based on the voltage difference, a second electrode of the capacitor, and an source of the transistor are configured to receive the second voltage level.

* * * * *

UNITED STATES PATENT AND TRADEMARK OFFICE
CERTIFICATE OF CORRECTION

PATENT NO. : 7,660,028 B2
APPLICATION NO. : 12/058456
DATED : February 9, 2010
INVENTOR(S) : Je-Hsiung Lan It is certified that error appears in the above-identified patent and that said Letters Patent is hereby corrected as shown below:

At FIG. 15, Drawing Sheet 15 of 16, below reference numeral 1410, please delete "$V_{addres}$" and insert therefore, --$V_{address}$--.

At column 1, line 14, please delete "and or" and insert therefore, --and/or--.

At column 1, line 48, after "conditions" please add --.--.

At column 12, approximately line 59, please delete "VDD" and insert therefore, --$V_{DD}$--.

At column 17, line 11, in Claim 9, please delete "an" and insert therefore, --a--.

At column 18, line 39, in Claim 28, please delete "an" and insert therefore, --a--.

At column 18, line 49, in Claim 29, please delete "an" and insert therefore, --a--.

Signed and Sealed this

Twenty-seventh Day of July, 2010

David J. Kappos
*Director of the United States Patent and Trademark Office*